(12) United States Patent
Rusteberg et al.

(10) Patent No.: US 8,348,513 B2
(45) Date of Patent: Jan. 8, 2013

(54) DEVICE FOR AXIALLY PRELOADING A MACHINE ELEMENT

(75) Inventors: Stefan Rusteberg, Deutschland (DE); Friedrich Vollhüter, Deutschland (DE); Karl Seng, Deutschland (DE)

(73) Assignee: Audi AG, Ingolstadt (DE)

( * ) Notice: Subject to any disclaimer, the term of this patent is extended or adjusted under 35 U.S.C. 154(b) by 458 days.

(21) Appl. No.: 12/666,214

(22) PCT Filed: Nov. 14, 2007

(86) PCT No.: PCT/EP2007/009853
§ 371 (c)(1),
(2), (4) Date: Dec. 22, 2009

(87) PCT Pub. No.: WO2009/000308
PCT Pub. Date: Dec. 31, 2008

(65) Prior Publication Data
US 2010/0178003 A1     Jul. 15, 2010

(30) Foreign Application Priority Data
Jun. 22, 2007 (DE) .......................... 10 2007 028 948

(51) Int. Cl.
*F16C 19/10* (2006.01)
*F16C 27/08* (2006.01)
*F16C 33/66* (2006.01)

(52) U.S. Cl. ........................................ 384/517; 384/563

(58) Field of Classification Search .................. 384/495, 384/517, 519, 520, 548, 551, 563, 612
See application file for complete search history.

(56) References Cited

U.S. PATENT DOCUMENTS

| | | | | |
|---|---|---|---|---|
| 2,368,963 A * | 2/1945 | Boden | ........................... | 184/11.1 |
| 2,548,258 A * | 4/1951 | Griffith | ........................... | 475/245 |
| 3,566,436 A * | 3/1971 | Marks et al. | ........................... | 16/405 |
| 3,744,274 A * | 7/1973 | Sekiya et al. | ........................... | 464/160 |
| 3,952,608 A | 4/1976 | Kanai et al. | | |
| 3,995,921 A * | 12/1976 | Ackeret | ........................... | 312/9.23 |
| 4,523,864 A * | 6/1985 | Walter et al. | ........................... | 384/613 |
| 4,573,809 A * | 3/1986 | Jacob | ........................... | 384/517 |
| 4,611,935 A * | 9/1986 | Rode | ........................... | 384/548 |
| 4,798,560 A | 1/1989 | Farrell | | |
| 5,549,397 A * | 8/1996 | Rode | ........................... | 384/551 |
| 5,785,434 A * | 7/1998 | Rode | ........................... | 384/563 |
| 6,086,498 A * | 7/2000 | Hashimoto | ........................... | 474/111 |
| 6,418,613 B1 * | 7/2002 | Rode | ........................... | 29/898.09 |
| 6,461,051 B1 * | 10/2002 | Rode | ........................... | 384/551 |
| 6,612,953 B2 * | 9/2003 | Tada | ........................... | 474/111 |
| 6,684,506 B2 * | 2/2004 | Rode | ........................... | 29/898.09 |
| 6,793,398 B2 * | 9/2004 | Nahrwold et al. | ........................... | 384/563 |
| 6,824,489 B2 * | 11/2004 | Jacob et al. | ........................... | 384/504 |
| 7,059,777 B2 * | 6/2006 | Kawaguchi et al. | ........................... | 384/512 |
| 2002/0186910 A1* | 12/2002 | Maret | ........................... | 384/513 |

* cited by examiner

*Primary Examiner* — Marcus Charles
(74) *Attorney, Agent, or Firm* — Novak Druce + Quigg LLP

(57) ABSTRACT

A device for axially preloading a machine element that is arranged in a housing, with an annular steel spring that has an open hollow profile in cross-section, on which at least on one side is molded an annular collar that rests on the machine element and that has an axial contact surface, the steel spring being preloaded via a safety element against the machine element with a force that exceeds the operating force that occurs. A structurally simple device that ensures high preloading forces with advantageous tolerance compensation is achieved by the steel spring with an axisymmetrical, semicircular section with an essentially uniform radius R1 undergoing transition indirectly or directly via a smaller radius R2 into the annular collar.

9 Claims, 2 Drawing Sheets

DEVICE FOR AXIALLY PRELOADING A MACHINE ELEMENT

CROSS-REFERENCE TO RELATED APPLICATIONS

This application is a 35 U.S.C. 371 National Stage of PCT/EP2007/009853 filed on Nov. 14, 2007, which claims priority from German Patent Application No. 10 2007 028 948.2-15 filed on Jun. 22, 2007, the entire disclosures of which are hereby incorporated by reference.

The invention relates to a device for axially preloading a machine element.

BACKGROUND OF THE INVENTION

Field of Invention

U.S. Pat. No. 4,798,560 shows such a device, for example, based on a wheel bearing for wheels of motor vehicles. In this case, the double-row roller bearing between the wheel bearings and the flanged shaft is preloaded with its inner ring via an annular steel spring that is approximately V-shaped in cross-section and a clamped-in safety ring against an annular collar of the flanged shaft. The safety ring can thus compensate for manufacturing tolerances and potential subsidence processes while maintaining relatively uniform preloading. It is understood that the preloading has to be greater than the maximum operating load that occurs.

The object of the invention is to provide a device of the generic type that makes possible a greater compensatory tolerance at high preloading values with simple means and thus offers an expanded field of operation. As machine elements, for example, highly-loaded roller bearings or multi-disk clutches are suitable.

SUMMARY OF THE INVENTION

According to the invention, it is proposed that the steel spring with an axisymmetrical, semi-circular section with an essentially uniform radius R1 undergoes transition indirectly or directly via a smaller radius R2 into the annular collar. This design of the steel spring produces a largely uniform stress curve with an advantageous transition via the radius R2 into the annular collar which rests on the machine element that is to be preloaded. The semi-circular section can be designed shaped like an arc with continuous, tangential transitions with small, varying radii R1 and can be defined optionally according to conditions.

In another configuration of the invention, a linear transition area that has a defined angle W1 to a perpendicular line of between ±10 degrees, in particular approximately +5 degrees, can be provided between the semi-circular section and the radius R2 of the annular collar, said transition area undergoing transition tangentially into the adjoining radii R1, R2. This contributes to the fact that a still more advantageous stress curve can be implemented with uniformly applied compressive stresses.

Furthermore, to achieve a reliable centering on the steel spring, an assembly collar can be molded axially opposite to the annular collar, which assembly collar rests with one bearing surface on the safety element, the assembly collar with a radius R4 undergoing transition indirectly or directly into the semi-circular section of the steel spring.

A linear transition area can also be provided here between the semi-circular section and the radius R4 of the assembly collar, said transition area having an angle W2 to a perpendicular line of between +5 to +15 degrees and undergoing transition tangentially into the adjoining radii R2 and R4, with, in turn, the advantage of a more uniform stress application.

When using a safety ring that is to be clamped in on the steel spring, at its outside periphery, the axially oriented assembly collar can have a stepped structure to the transition area or semi-circular section of the steel spring, which preferably is used to mount an assembly device.

Advantageously, the wall thickness T of the steel spring can be no more than 15% uneven, but preferably constant. Small deviations of the wall thickness can be produced, for example, by the manufacturing process or by bending processes in the area in particular of the radii R2 and R4.

In addition, the smallest cross-section of the wall thickness T in the area of the radius R4 in a stepped structure on the outside periphery of the annular collar should not be less than 60% to rule out unacceptable stresses in this range.

The steel spring can be designed especially advantageously in its length, wall thickness and/or strength so that during assembly, it is deformable in the elastic/plastic range, whereby the assembly force is >than the preloading force and the latter has to be >than the operating load that occurs. This plastic deformation that is applied, of course, within a narrowly confined area makes possible an even greater tolerance compensation by the steel spring at defined preloading values.

The machine element can preferably be a double-row roller bearing, which is arranged in a gearbox and has two bearing inner rings, which on the one hand rest axially on a component that is solid with the shaft and on the other hand are axially preloaded via the steel spring and the safety element. With this highly-loaded type of roller bearing, both the bearing preloading with compensation for subsidences, intake pmcesses, bearing wear and tear, etc., are compensated via the steel spring, and, moreover, the entire operating load is taken up.

Finally, it is proposed that the safety element is a safety ring that can be clamped into an annular groove of the shaft, which represents a reliable axial safety device with simple assembly and low production expense. However, the safety element can also be, for example, a threaded nut that is screwed onto the shaft.

DETAILED DESCRIPTION OF THE PREFERRED EMBODIMENTS OF THE INVENTION

Figure 1:
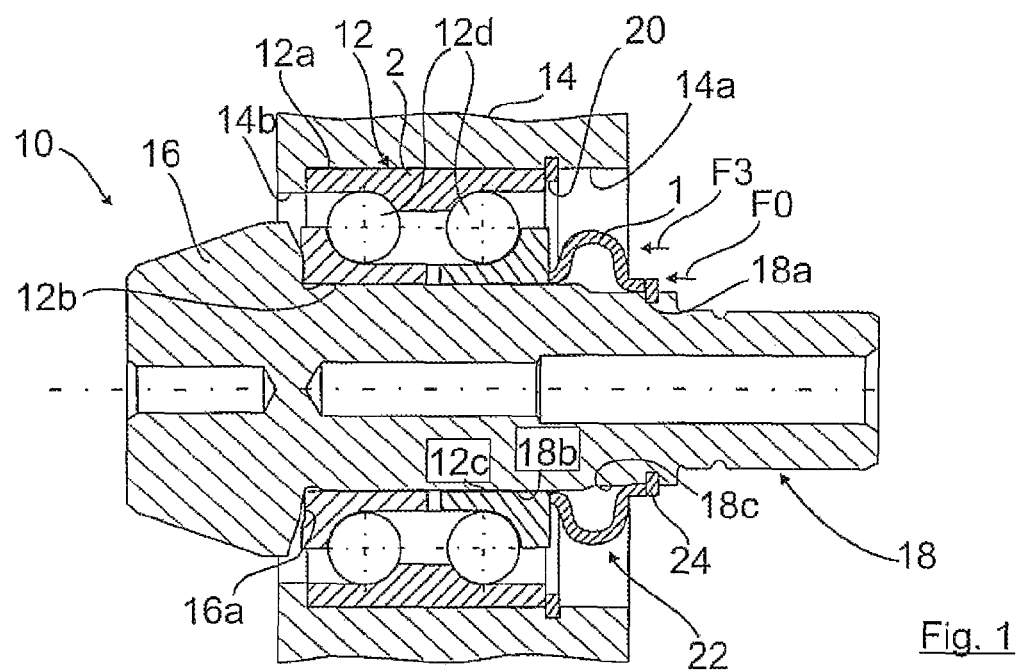
FIG. 1 A device for preloading a double-row roller bearing between a shaft that carries a bevel gear pinion and a gearbox with an annular steel spring and a safety ring.

In FIG. 1, a device for preloading a machine element, here a double-row roller bearing or an angular ball bearing 12 between an only partially depicted gearbox 14 and a shaft 18 that carries a bevel gear pinion 16, is shown as 10.

The bearing outer ring 12a of the ball bearing 12 is inserted into a hole 14a of the gearbox 14 and held axially on, the one hand, an annular collar 14b and, on the other hand, by means of a clamped-in safety ring 20.

The two bearing inner rings 12b, 12c of the ball bearing 12 are pressed onto the shaft 18, the bearing inner ring 12b resting on a radial surface 16*a* of the bevel gear pinion 16, while the second bearing inner ring 12*c* is held axially and with preloading via an annular, axisymmetrical steel spring 22 and a safety ring 24 that is clamped into an annular groove 18*a* of the shaft 18. The preloading that is exerted by the steel spring 22 is transferred by the divided bearing inner ring 12*b*, 12*c* with a piston ring that is found interjacent to the angular ball bearing 12 with the balls 12*d* that are inserted and ensures a preloaded bearing with zero play.

Figure 2:
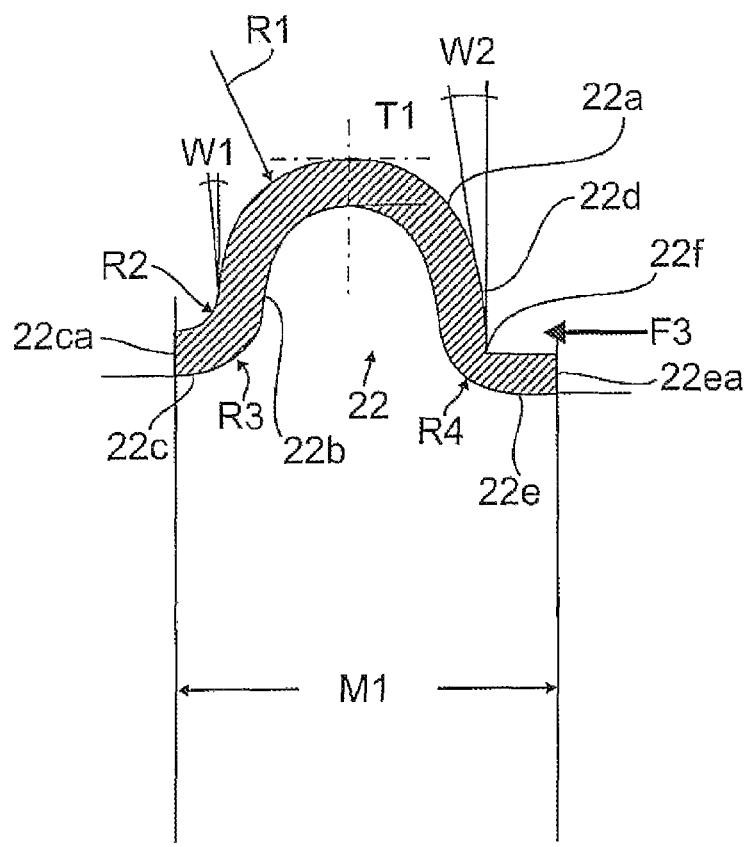
FIG. 2 the steel spring according to FIG. 1 in an enlarged view.

According to FIG. 2, the steel spring 22 has a semi-circular section 22*a* with a radius R1, which undergoes transition on the roller bearing side via a linear transition area 22*b* and an opposing radius R2 or R3 in an annular collar 22*c*. The annular collar 22*c* rests with a radially oriented contact surface 22*ca* on the bearing inner ring 12*c* of the ball bearing 12.

The semi-circular section 22*a* can also be designed in an arc with small, varying radii R1, which undergo transition into one another tangentially and optionally are defined by ratios.

Furthermore, the semi-circular section 22*a* of the steel spring 22 also undergoes transition into a linear transition area 22*d* and into an opposing radius R4 in an assembly collar 22*e* that is in turn axially directed and that is supported in the mounted state on the safety ring 24 with a radial contact surface 22*ea*. On its outside periphery, the assembly collar 22*e* undergoes transition in a stepped process at 22*f* into the linear transition area 22*d*. As a result, an annular, flat contact surface for a sleeve-shaped assembly tool (not shown) is provided for advantageous discharge of high assembly forces.

The transition areas 22*b* and 22*d* are designed in an inclined manner at an angle W1 or W2 of −3 degrees or +10 degrees to a perpendicular line that is placed on the axis of rotation of the shaft 18 (cf. FIG. 2) and run tangentially in each case into the adjoining areas or the radii R1, R2, R3 or R1, R4.

The wall thickness T of the steel spring 22 is made constant, however, a cross-section reduction by about 20% of the wall thickness T being established at the assembly collar 22*e* because of the stepped configuration at 22*f*.

Furthermore, in the embodiment, the inside diameter of the annular collar 22*c* and the assembly collar 22*e* are made unevenly dimensioned to ensure an exact centering of the steel spring 22 on the shaft 18 or the shaft sections 18*b*, 18*c* thereof that also vary in diameter (FIG. 1).

Figure 3:
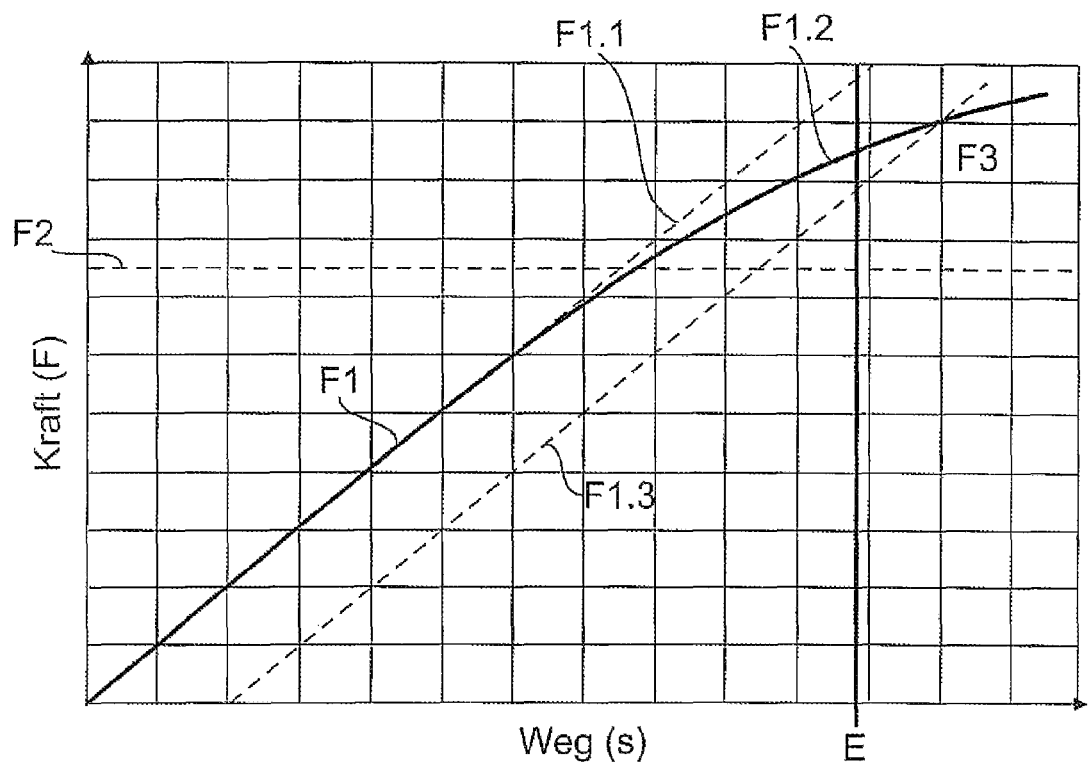
FIG. 3 a force-distance diagram of the steel spring according to FIGS. 1 and 2.

FIG. 3 shows a force-distance diagram of the steel spring 22 and its preloading curve. The preloading force F is applied via the distance s of the steel spring 22.

In this case, the horizontal dotted line F2 indicates the maximum operating force, which is to be supported via the steel spring 22.

The line F1 that continuously rises over the distance s is the preloading force that is exerted with increasing compression of the steel spring 22 and that has the characteristic F1, F1.1 (dotted adjoining branch) only in the elastic range in a structural design. The preloading force F1, F1.1 continuously increases until it reaches a point above the perpendicular line E. Line E refers to the final assembly state of the steel spring 22, in which the latter is appropriately supported after clamping of the safety ring 24. In this state, the preloading force FO (in each case on the line E) is reached, which clearly has to be greater than F2.

If the steel spring 22 is designed so that for compensation of higher manufacturing tolerances within the device 10, the latter is loaded during assembly in the range of plastic deformation with the assembly force F3, the force-distance characteristic according to F1, F1.2 that is indicated in solid lines is thus produced. As can be seen, the preloading force F1.2 in the transition from elastic into plastic deformation turns into a flatter increase of force, in which the steel spring 22 adapts to the actual distance conditions. In turn, in the final assembly state, the somewhat lower preloading force FO rests on the perpendicular line E.

The dotted line F1.3 ultimately shows the force-distance characteristic of the steel spring 22 in the remaining elastic range/hysteresis, which is produced from the excessive pressure with the assembly force F3 of the steel spring 22 that is designed in the plastic range. Also here, the necessary preloading force FO is still above the operating force F2.

The steel spring 22 (FIG. 2) here is designed in its length M1, wall thickness T and/or strength (heat treatment) so that during assembly, it can be deformed in the plastic range, whereby the assembly force F3 has to be higher than the preloading force FO, and the latter has to be higher that the operating force F2 that occurs.

The assembly of the steel spring 22 as a preloading element with a plastic deforming range is as follows:

First, the roller bearing 12 (FIG. 1) is conventionally mounted in the gearbox 14 and on the shaft 18. Then, the steel spring 22 is pushed onto the shaft 18 until it rests with its contact surface 22*ca* of its annular collar 22*c* on the bearing inner ring 12*c*. Also, the safety ring 24 is pushed open onto the shaft 18.

Then, the assembly force F3 is introduced via the assembly collar 22*e* via a sleeve-shaped assembly tool, not shown. The steel spring 22 is thus compressed. In the force-distance diagram, the elastic characteristic F1 is first produced.

With further compression of the steel spring 22, the latter begins to be plastically deformed. In the force-distance diagram, the elastic characteristic F1 undergoes transition into the flattening plastic characteristic F1.2.

The steel spring 22 is compressed until the annular groove 18*a* on the shaft 18 is exposed, and the safety ring 24 can be clamped in via the assembly tool, not shown. Then, the assembly force F3 is withdrawn, and the assembly collar 22*e* of the steel spring 22 can be supported on the safety ring 24 via the contact surface 22*ea*.

The final assembly position E with the preloading force FO (FIG. 3) is reached with this springing back of the steel spring 22.

The assembly of a steel spring 22 that acts only in the elastic range is as above; in the final assembly position E, the preloading force FO is reached here according to the force-distance characteristic F1, F1.1.

The invention claimed is:

1. A device for axially preloading a machine element that is arranged in a housing, with an annular steel spring that has an open hollow profile in cross-section, on which at least on one side, an annular collar that rests on the machine element and that has an axial contact surface, the steel spring being stressed via a safety element against the machine element with a force FO that exceeds the operating load that occurs, wherein the steel spring with an axisymmetrical, semi-circular section with an essentially uniform radius R1 undergoes transition indirectly or directly via a smaller radius R2 into the annular collar, and wherein between the semi-circular section and the radius R2 of the annular collar, a linear transition area that has a defined angle W1 to a perpendicular line of between ±10 degrees, which undergoes transition tangentially into the adjoining radii R1, R2.

2. The device according to claim 1 wherein the wall thickness T of the steel spring is no more than 15% uneven.

3. The device according to claim 2 wherein the smallest cross-section of the wall thickness T in the area of the radius R4 in a stepped structure on the outside periphery of the assembly collar is not less than 60%.

4. The device according to claim 1 wherein the steel spring is designed in its length, wall thickness and/or strength so that during assembly it can be deformed in the elastic/plastic range, the assembly force F3 being greater than the preloading force, and the latter is greater than the operating force F2 that occurs.

5. The device according to claim 1 wherein during operation, the machine element can be loaded axially, as well as a roller bearing or an engaged bearing pair, which is arranged in a gearbox and has two bearing inner rings, which, on the one hand, rest axially on a solid component with the shaft and, on the other hand, are axially preloaded via the steel spring and the safety element.

6. The device according to claim 5 wherein the safety element is a safety ring that can be clamped into an annular groove of the shaft.

7. A device for axially preloading a machine element that is arranged in a housing, with an annular steel spring that has an open hollow profile in cross-section, on which at least on one side, an annular collar that rests on the machine element and that has an axial contact surface is molded, the steel spring being stressed via a safety element against the machine element with a FO that exceeds the operating load that occurs, wherein the steel spring with an axisymmetrical, semi-circular section with an essentially uniform radius R1 undergoes transition indirectly or directly via a smaller radius R2 into the annular collar, and an assembly collar is integral with the steel spring axially opposite to the annular collar, and said assembly collar rests on the safety element with a contact surface and that the assembly collar with a radius R4 undergoes transition indirectly or directly into the semi-circular section.

8. The device according to claim 7 wherein between the semi-circular section and the radius R4 of the assembly collar, a linear transition area is also provided, which has an angle W2 to a perpendicular line of between +5 to 15 degrees and which undergoes transition tangentially into the adjoining radii R2 and R4.

9. The device according to claims 7 wherein the axially oriented assembly collar on its outside periphery has a stepped structure to the transition area or semi-circular section of the steel spring.

* * * * *